United States Patent [19]

Stella

[11] 4,170,407
[45] Oct. 9, 1979

[54] SOUND FILM CASSETTE EMPLOYING SEPARATING WEB

[75] Inventor: Joseph A. Stella, Peabody, Mass.

[73] Assignee: Polaroid Corporation, Cambridge, Mass.

[21] Appl. No.: 947,769

[22] Filed: Oct. 2, 1978

[51] Int. Cl.² ............................................. G03B 23/02
[52] U.S. Cl. ...................................... 352/72; 352/27; 352/29; 352/78 R; 242/71.2; 352/130
[58] Field of Search ................... 352/129, 72, 78 R, 27, 352/29, 130; 242/71.2, 199

[56] References Cited
U.S. PATENT DOCUMENTS

| | | | |
|---|---|---|---|
| 1,957,525 | 5/1934 | Brown et al. | 352/31 |
| 1,963,179 | 6/1934 | Stacey | 242/56.1 |
| 3,240,329 | 3/1966 | Custin | 206/59 |
| 3,600,071 | 8/1971 | Downey | 352/78 R |
| 3,604,790 | 9/1971 | Land et al. | 352/29 |
| 3,615,127 | 10/1971 | Land | 352/78 R |
| 3,674,345 | 7/1972 | Chernotsky et al. | 352/72 |
| 3,856,387 | 12/1974 | Wray et al. | 352/5 |
| 3,895,862 | 7/1975 | Stella et al. | 352/130 |

OTHER PUBLICATIONS
U.S. Patent Application Ser. No. 869,131, filed Jan. 13, 1978, Land et al.
U.S. Patent Application Ser. No. 899,872, filed Apr. 25, 1978, Mason.

Primary Examiner—Monroe H. Hayes
Attorney, Agent, or Firm—David R. Thornton

[57] ABSTRACT

A multipurpose audio/visual film cassette including supply and takeup spools in which opposite ends of a film strip are coupled for alternate winding and unwinding during passage through a first path for film exposing, processing and projecting operations with an audio tape also coupled at least on one end with the supply spool and interwound with the film strip to pass through a separate path, and a separating web is coupled at least on one end to the supply spool and preferably extending directly to the takeup spool in a third path. The separating web is arranged to overlie the side of the film strip on which processing fluid is deposited so as to be wound in convolutions between such side and the sound tape in order to prevent adherence of the sound tape to the film strip as a result of being interwound therewith before the processing fluid has dried.

14 Claims, 4 Drawing Figures

SOUND FILM CASSETTE EMPLOYING SEPARATING WEB

BACKGROUND OF THE INVENTION

This invention relates to audio/visual systems and, more particularly, to an improved multipurpose, film handling cassette for sound motion picture systems.

Motion picture systems including a multipurpose film cassette in which a film strip is contained without removal during exposure, processing and projection operations are described in prior U.S. Pat. Nos. 3,615,127 issued Oct. 26, 1961 to Edwin H. Land; 3,600,071 issued Aug. 17, 1971 to Rogers B. Downey; and 3,895,862 issued July 22, 1975 to Joseph A. Stella, et al. In accordance with the disclosures of these patents, the film cassette is first placed in a camera for exposure of the film strip therein in conventional fashion. After exposure, the cassette is loaded into a viewing device which first subjects the cassette to a sequence of operations during which the film strip is processed to develop a series of image transparency frames. The same viewing device then projects the developed image frames onto a screen for motion picture viewing.

The cassette system represented by the disclosure of these prior patents may be provided with an audio capability as disclosed in prior U.S. Pat. Nos. 3,604,790 issued Sept. 14, 1971 to Edwin H. Land and 3,856,387 issued Dec. 24, 1974 to William R. Wray, et al. In the audio/visual systems disclosed in these latter patents, a magnetic sound recording track is provided along one or both of the longitudinal borders of the cassette contained film strip and the cassette includes a provision for moving a loop of the film strip in operative relationship with a transducing head forming part of an audio system. While the arrangements disclosed in these patents provide generally acceptable audio reproduction, the narrow width of the audio tracks necessitated by their being carried directly on the film strip limits the level of sound quality which may be achieved or, conversely, increases the degree of sophistication or cost required of the audio system to achieve high fidelity.

In commonly assigned copending U.S. applications Ser. No. 869,131, filed Jan. 13, 1978 by Edwin H. Land, et al., and Ser. No. 899,872, filed Apr. 25, 1978, by Paul B. Mason, the sound track dimensional limitations of the prior systems are solved by providing in each cassette a separate audio tape in addition to the usual photographic film strip. Both the tape and the strip extend between and are interwound in nesting convolutions on cassette contained supply and takeup spools. In this way, both the tape and the film strip are simultaneously wound or unwound from the respective spools but the path through which the sound tape passes between the spools is different from that of the film strip. In particular, the film strip travels through a path including an exposure/projection station whereas the sound tape travels in a path including an audio transducing head and drive capstan.

The principal difficulty encountered with such dual web systems in the multipurpose cassettes having a provision for processing the motion picture film strip is the tendency for the sound tape to adhere to the emulsion or, at least, to processing fluid on the film strip emulsion during the period just following the deposition of processing fluid on the film strip. This problem is recognized in the above-noted application Ser. No. 899,872 and addressed by providing a mechanical stripping device for separating the sound tape from the film strip. Relative movement of the mechanical stripping device and the film strip, however, is likely to produce an undesirable wearing and possibly damage to one or both webs, particularly after repeated projection cycles.

SUMMARY OF THE PRESENT INVENTION

In accordance with the present invention, the problems associated with dual web multipurpose film cassettes as a result of the tendency for a sound tape to adhere to the tacky emulsion surface of the processed film strip are alleviated by providing a third or separating web extending between the cassette contained supply and takeup spools with the sound tape and film strip. The separating web is interposed between the tape and the film emulsion surface, and passes between the spools under tension adequate to assure ready separation of the separating web from the emulsion side of the film strip in a smooth and positive manner without interfering in any way with the operation of the cassette in any of its several modes of operation. The separating web is interposed between the emulsion side of the film strip and the sound tape so that when the three webs are wound in nesting or interleaved convolutions on either one or both of the supply and takeup spools, one side of the sound tape is in contact with the dry carrier side of the film strip whereas the other side of the sound tape is in contact with the separating web. Also, in an alternate embodiment, the separating web may be provided with marginal rails so as to space the intermediate portion of the separating web physically away from the emulsion layer of the film strip.

Among the objects of the present invention are, therefore, the provision of an improved multipurpose film cassette capable of use with audio/visual apparatus; the provision of such a film cassette in which a sound tape may be wound with a film strip immediately after the deposition of a processing liquid thereon without adherence of the sound strip to the film strip; the provision of an improved web separating arrangement for dual web multipurpose photographic film cassetts; and the provision of such an improved arrangement which is low in cost, easy to adapt to existing cassette designs and trouble-free in operation.

Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENT

Figure 1:
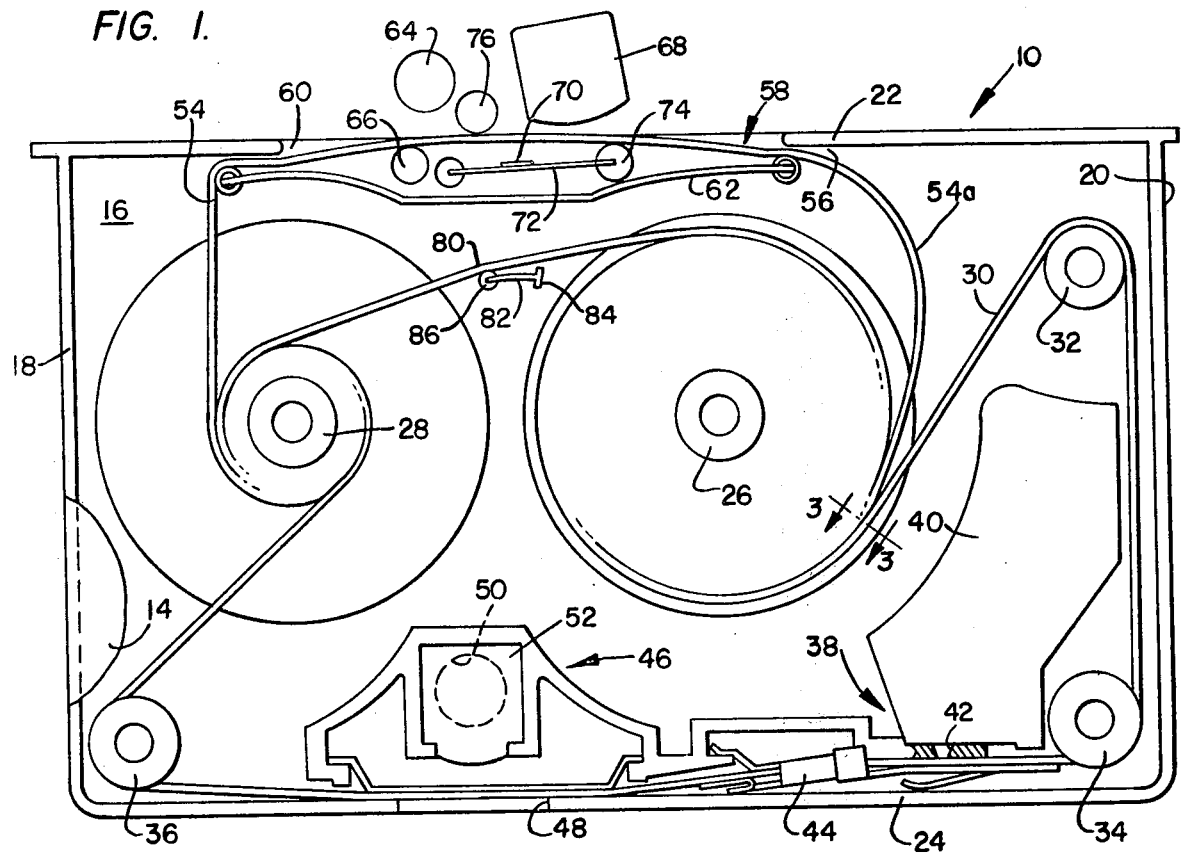
FIG. 1 is a cutaway side elevation illustrating the interior components of a multipurpose film cassette in accordance with the present invention.

In FIG. 1 of the drawings, an embodiment of the present invention is shown in a multipurpose film cassette of a type similar to those described in the afore-mentioned patents and copending applications. As such, the cassette includes an exterior housing 10 defined by planar side walls 14 and 16 joined by end walls 18 and 20 and by elongated top and bottom walls 22 and 24, respectively. Rotatably supported on parallel axes between the side walls 14 and 16 are supply and takeup spools 26 and 28, respectively, to which opposite ends of a photographic film strip 30 are attached. The path of the film strip 30 between the supply and takeup spools, as described in the prior patents and applications, extends from the supply spool 26 about a bobulator roller 32, an idler roller 34, through a flight along the interior of the bottom wall 24, about a snubbing roller 36 and finally to the takeup spool 28.

In its flight between the idler roller 34 and the snubbing roller 36, the film strip 30 passes through a photographic station including a processing station 38 which, as described in the afore-mentioned patents and applications, includes a reservoir 40 for containing a supply of processing fluid adapted to be applied to the emulsion side of the film strip 30 through a nozzle 42. Also shown in FIG. 1 of the drawings is a valve assembly 44 movable by the film strip 30 during the terminal portions of a processing cycle to a position closing the nozzle 42.

After passing the processing station 38 during travel through the photographic station in a direction proceeding from the supply spool 26 to the takeup spool 28, the film strip 30 passes an exposure/projection station 46 which includes an opening 48 in the bottom wall 24 through which light may pass both during exposure of the film strip in a motion picture camera (not shown) and during projection in a viewing device (not shown). In this latter respect, the station 46 includes an opening 50 through which light from a projector is passed to a reflecting prism 52 through the film strip and the opening 48.

Inasmuch as the operation of the cassette during exposure, processing and projection of the film strip 30 is fully described in one or more of the afore-mentioned patents, these operations will be only cursorily summarized herein. In particular, when the cassette is loaded in an appropriate camera, the film strip travels through its path from the supply spool 26 to the takeup spool 28 for exposure of successive image frames at the station 46. When the film strip 30 is so exposed, it will be wound on the supply spool 28. The cassette is then removed from the camera and placed in the viewing device of the system which programs a processing cycle during which the film strip 30 is rewound from the takeup spool 28 to the supply spool 26. During the initial portion of such rewinding, the processing station 38 is activated and the emulsion side of the film strip will be coated with a layer of processing fluid as the strip is rewound on the supply spool 26. Thereafter, the direction of film strip travel is reversed for projection of the developed images thereon.

To provide for an audio capability and as disclosed in the afore-mentioned copending applications Ser. Nos. 869,131 and 899,872, the illustrated multipurpose cassette is provided with a separate audio tape 54 having an oxide coating 55 (shown in FIG. 3). The tape 54 is a flexible web of the same width as the film strip 30 and is interwound with the film strip 30, in the disclosed embodiment, on both the supply and takeup spools 26 and 28. In this respect, opposite ends of both the film strip 30 and the audio tape 54 are secured in overlying relationship to both the supply and takeup spools in the cassette illustrated. While both webs are coupled to the spool, only one of the webs (i.e., the film strip) need be directly connected to the spool while the other web (i.e., the tape) may be connected to the first at a point close to the latter's spool connection.

In FIG. 1 of the drawings, the condition of both the strip 30 and the tape 54 are illustrated in their relative conditions in an unused cassette in which both webs are on the supply spool 26. The path through which the audio tape 54, however, extends from the supply spool to the takeup spool 28 diverges from that taken by the film strip 30. In particular, the audio tape proceeds from the supply spool upwardly through a tape exit opening 56, past an audio station 58 defined in part by an opening in the top wall 22 of the cassette housing 10, to a cassette entry opening 60 where it re-enters the cassette and passes to its point of attachment with the takeup spool 28. The exit 56 and the entry 60 are established in part by a light shielding baffle 62 having low friction guiding surfaces 61 and 63 at opposite ends and spanning the opening 58 in the top wall 22 of the cassette.

As will be apparent from a reference to the drawings of copending application Ser. No. 869,131, the path of the audio tape 54 may alternately extend from the supply spool, past an audio station to a second takeup spool (not shown) separate from the film takeup spool 28. In such a cassette, only one end of the audio tape is connected to the supply spool, but the same interwinding of the audio tape and the film strip will occur during processing and/or rewinding of the film strip from the takeup spool 28 back to the supply spool 26.

Figure 2:
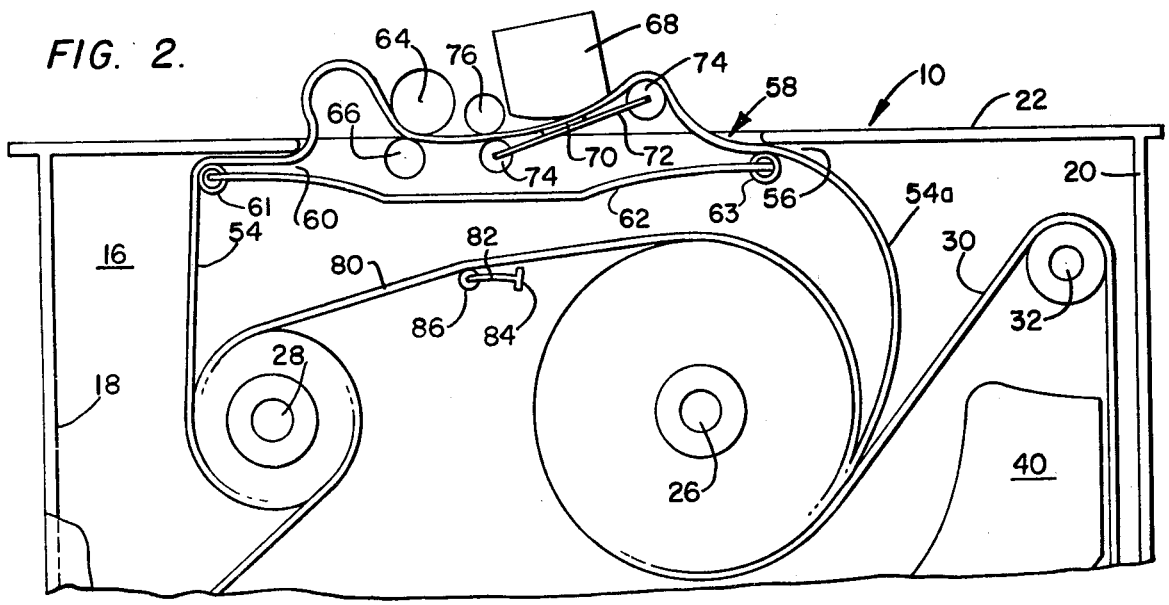
FIG. 2 is a fragmentary side elevation similar to FIG. 1 but with the components in a different condition of operation.

Suitable audio components carried by either or both the photographic camera and the viewing device with which the cassette is to be used are illustrated in respective inactive and operative conditions in FIGS. 1 and 2 of the drawings. As schematically shown in these figures, the audio components include a drive capstan 64 and a backup idler roller 66 which, when closed on one another, operate to advance the audio tape 54 at uniform speed past a transducing head 68. A head backup pad 70 supported by a member 72 extending between a pair of head backup rollers 74 retain the audio tape in operative engagmeent with the transducer head as illustrated in FIG. 2. An idler backup roller 76 engages one of the backup pad carrying rollers when the system is operative as illustrated in FIG. 2. Also it will be noted that in its initial condition as shown in FIG. 1, the audio tape 54 extends through loop portion 54a which is sufficiently stiff, at least over the initial portion thereof, to assume the bowed configuration in the opening 58 of the cassette housing so as to permit convenient insertion of appropriate audio components under the tape web 54. The loop 54a, as may be seen in FIG. 2, allows the audio tape 54 to be passed continuously at a constant speed past the transducer head 68 in operation irrespective of whether it is paid out from the supply spool at a constant speed.

The described components which cooperate with both the film strip 30 and the sound tape 54, as well as the general organization of the multipurpose cassette illustrated, are disclosed in one or more of the afore-mentioned patents or copending applications and as such are not in themselves novel with the present invention. Also, it has been recognized that the interwinding of the sound tape 54 with the film strip 30, particularly on the supply spool as an incident to film strip processing, gives rise to the problem of the sound tape sticking to the wet side of the film or, that is, wet processing fluid applied to the film strip immediately in advance of its being rewound onto the supply spool 26. In accordance with the present invention, this problem is effectively solved by interwinding with the audio and film webs, a third or separating web 80.

Figure 3:
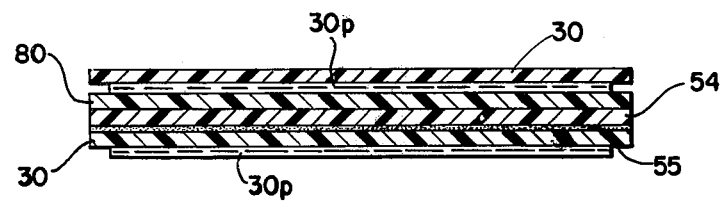
FIG. 3 is an enlarged cross section on line 3—3 of FIG. 2.

The web 80 is a flexible strip of, for example, plastic material such as Mylar, approximately equal in width to the film strip 30 and the tape web 54, and preferably inert and impervious to the processing fluid (designated as 30p in FIG. 3). Advantageously, like the film and tape, the separator web 80 need only be coupled to the spool and may be connected to one or both of the other strips near their spool end, rather than directly connected to the spool itself.

In the embodiment shown in both FIGS. 1 and 2 of the drawings, the separating web 80 extends directly from the supply to the takeup spool and is preferably guided along a separate path and maintained under tension with respect to both spools by a leaf spring 82 or other equivalent means secured to the front or back wall 14 or 16 of the cassette housing interior between the supply and takeup spools 26 and 28. In the illustrated embodiment, the tensioning spring 82 is in the nature of a flexible leaf spring cantilevered from a mounting boss 84 and having an anti-friction guide 86 at its projecting end.

In the cross-sectional view of FIG. 3, the respective webs as they are wound on the supply spool are shown greatly enlarged. By comparing FIG. 3 and FIG. 2 of the drawings, it will be seen that as the three webs are rewound on to the supply spool 26 during processing of the film strip 30, the layer of processing fluid 30p (FIG. 3) will be presented in an outwardly facing direction as the strip 30 is initially wound on the supply spool 26. The separating web 80 will then overlie the film emulsion surface which becomes wetted with the processing fluid. At the same time, the audio tape 54 will be interwound on the supply spool with one surface engaging the separating web 80 and the other surface (i.e., its oxide coating 55) contacting the base or always dry surface of the film strip 30. In this way, the audio tape 54 is never brought into direct contact with the emulsion or the web processing fluid layer 30p. It should be noted that the thickness of the processing layer 30p is exaggerated in FIGS. 3 and 4 for clarity; however, in practice the layer is initially less than 0.0005 inch and is to a large extent quickly absorbed into the emulsion surface of the film.

In the operation of the cassette incorporating the separating web 80 of the present invention, it will be appreciated that both the film strip and the audio tape may pass from the supply spool to the takeup spool in the manner above-mentioned. The separating web 80, being under a slight tension, will pass in an essentially tangential path from the supply spool. Any tendency for the separating web to adhere to the surface of the film strip 32 which the processing fluid 30p was applied, will be overcome by such tension.

Preferably, the separating web 80 extends over a path different from the separate paths of either the film strip 30 or the audio tape 54. However, since it is the easy release of the tape 54 from the film which is most important, so as to ensure minimum interference with the continuous drive of the sound tape, the passage of the separator web, at least, along a path different from that of the tape is desired. On the other hand, it should be noted that even where the separator web 80 and audio tape extend along identical paths, the separator web will still operate to isolate the tape from the retarding forces exerted during release of the emulsion from the adjoining web surface.

As previously noted, the sound tape may extend to a second takeup reel, and while it is preferable in such case, that the separating web pass to the film takeup reel, it should be understood that it could, of course, pass along a separate path to the tape takeup reel.

Figure 4:
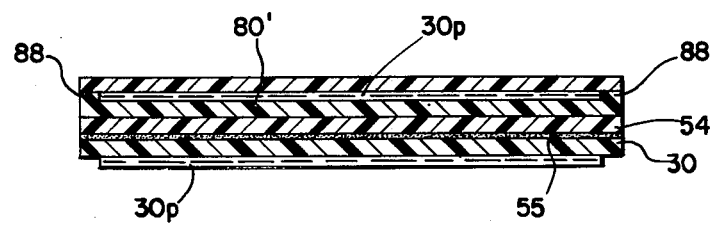
FIG. 4 is an enlarged cross section, similar to FIG. 3, but of an alternate embodiment.

In the preferred embodiment, the separating web is of uniform thickness across its width; however, a separating web 80′ may be provided with marginal rails 88 as shown in FIG. 4 of the drawings, in a manner to space the separating web physically from the layer of processing fluid covering the image receiving portion of the film strip 30 when the webs are interwound. Such rails, while slightly increasing the cross sectional thickness of the windings, can provide added protection to the fluid layer while still enhancing release of the film and tape.

Thus, it will be seen that as a result of the present invention, there is provided a highly effective audio/visual multipurpose cassette system by which the above-mentioned objectives are completely fulfilled. It will be equally apparent to those skilled in the art that modifications and/or changes may be made in the embodiments illustrated and described herein without departure from the invention. It is expressly intended therefore, that the foregoing description is illustrative of the preferred embodiments only, not limiting, and that the true spirit and scope of the present invention be determined by reference to the appended claims.

What is claimed is:

1. In a photographic film cassette containing a film strip coupled at opposite ends to respective spools upon which the strip may be alternately wound and unwound for passage of the strip along a first path, said film strip including an emulsion surface on one side thereof, the cassette further including an audio tape coupled at one end to at least one of said spools for interwinding thereon with the film strip and extending along a second path including an audio station, the improvement comprising:

a separating web of thin flexible material having one end coupled to said one spool for interwinding thereon with the film strip and the audio tape in an interleaved manner interposed between the audio tape and said emulsion surface of said one side of the film strip.

2. The apparatus recited in claim 1 including passage of said separating web along a path at least different from said second path.

3. The apparatus recited in claims 1 or 2 wherein the end of said separating web opposite from said one end is coupled to the other of said spools.

4. The apparatus recited in either of claims 1 or 2 including means for tensioning said separating web with respect to at least one spool to facilitate separation of said separating web from said film strip during unwinding thereof.

5. The apparatus recited in either of claims 1 or 2 including means for yieldably biasing said separating tape to provide a tension thereon with respect to at least said one spool.

6. The apparatus recited in claim 1 including passage of said separating web along a third path different at least in part from said first and said second path.

7. In a photographic film cassette containing a strip of photographic film coupled at opposite ends to supply and takeup spools upon which the strip may be alternately wound and unwound for passage of the strip along a first path including a processing station at which processing fluid is deposited on one side of the strip during a portion of its passage, the cassette further including an audio tape coupled at one end to the supply spool to be interwound with the film strip and extending along a second path including an audio station, the improvement comprising:

a separating web of thin flexible material having opposite ends coupled to the supply spool to be interwound thereon between said one side of the film strip and the audio tape in a manner to separate the audio tape from said one side of the film strip.

8. The apparatus recited in claim 7, including means for tensioning said separating web with respect to said supply spool.

9. The apparatus recited in claim 8 wherein the other end of said separating web is coupled to the takeup spool and said tensioning means includes yieldable guide means positioned between the supply and takeup spools to tension said separating web with respect thereto.

10. The apparatus recited in claim 8 wherein said separating web includes marginal rails on the side thereof adjacent said one side of the film strip on which processing fluid is deposited.

11. A photographic film cassette comprising:
a housing defining a light-tight chamber;
supply and takeup spools rotatably mounted in said chamber on spaced parallel axes;
a film strip defining a first web having opposite ends coupled to said supply and takeup spools;
means for guiding said first web in a first path including a processing station at which processing fluid is deposited on one side of said first web as it is wound on said supply spool;
a second web having one end coupled to said supply spool and adapted to be interwound on said supply spool with said first web;
means for guiding said second web through a second path different from said first path;
a third web having one end coupled to said supply spool and adapted to be interwound thereon with said first and second webs in convolutions lying between said one side of said first web and said second web; and
means for guiding said third web in a third path different from said first and second paths.

12. The apparatus recited in claim 11 wherein the end of said third web opposite from said one end is coupled to said takeup spool.

13. The apparatus recited in claim 11 including means for tensioning said third web.

14. The apparatus recited in claim 13 wherein said tensioning means comprises a yieldable guide supported in said housing between said supply and takeup spools.

* * * * *